United States Patent
Blee et al.

(10) Patent No.: US 6,229,948 B1
(45) Date of Patent: May 8, 2001

(54) APPARATUS FOR POLE-MOUNTING AN OPTICAL FIBER SPLICE CLOSURE

(75) Inventors: John James Blee, Lilburn; Leon J. Burcum, Buford; Denis Edward Burek, Forsyth; Marc Duane Jones, DeKalb; Wesley Willing Jones, Gwinnett, all of GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/392,038

(22) Filed: Sep. 8, 1999

(51) Int. Cl.[7] .................................................. G02B 6/00
(52) U.S. Cl. ........................... 385/134; 385/136; 385/137
(58) Field of Search .................................. 385/134, 135, 385/147, 136, 137

(56) References Cited

U.S. PATENT DOCUMENTS

| | | | |
|---|---|---|---|
| 3,921,949 | * 11/1975 | Coon | 248/221 |
| 4,805,979 | * 2/1989 | Bossard et al. | 350/96.2 |
| 5,702,081 | * 12/1997 | Gallemore, II | 248/218.4 |
| 5,862,290 | 1/1999 | Burek et al. | 385/135 |
| 5,897,081 | * 4/1999 | Dechen | 248/61 |

* cited by examiner

Primary Examiner—Cassandra Spyrou
Assistant Examiner—Euncha Cherry
(74) Attorney, Agent, or Firm—Thomas, Kayden, Horstemeyer & Risley, LLP

(57) ABSTRACT

A preferred embodiment of the present invention includes a base member with first and second base portions that are angled relative to each other for aligning a longitudinal axis of the base member in a parallel relationship with a longitudinal axis of a pole. Preferably, first and second side walls extend outwardly from the base member for engaging mounting ribs of the splice closure. Preferably, the mounting ribs of the splice closure engage the bracket in a straddled configuration.

11 Claims, 2 Drawing Sheets

APPARATUS FOR POLE-MOUNTING AN OPTICAL FIBER SPLICE CLOSURE

BACKGROUND OF THE INVENTION

1. Field of the Invention

The present invention generally relates to optical fiber cable splice closures and, in particular, to devices for mounting such splice closures to above-ground poles.

2. Description of the Related Art

Optical fibers, which are utilized as transmission media for the transmission of communications signals, typically are combined to form cables, with each of the optical fibers of such a cable being protected by at least one layer of coating material. Typically, the optical fibers are arranged in groups which are held together by tubes to form a core of the cable. This core or core tube typically is then enclosed in a protective jacket which oftentimes is formed of metal or plastic.

Regardless of the particular cable configuration utilized, it usually is necessary to splice together the ends of cables, which entails splicing together each of the individual fibers of a first cable to be spliced with a corresponding individual fiber of a second cable to be spliced. To this end, a splice closure typically is provided to retain the ends of the fibers and to protect the splices of the various fibers, such as from moisture, as well as other physical forces. Such a splice closure is presented, for instance, in U.S. Pat. No. 5,862,290, issued to Burek et al., and which is assigned to Lucent Technologies, Inc. In that arrangement, a base portion and a cover portion of the splice closure define an enclosure having open ends for cable entrance and exit. The base and cover portions preferably are substantially identical in shape and are formed of molded plastic material, with the portions being securable to each other by means of flanges, which extend outwardly from their respective portions, and which typically are secured to each other by bolts. A grip block is mounted within the enclosure for securing the cables to be spliced in place within the splice closure. Additionally, the splice closure preferably includes one or more ribs extending from the aforementioned flanges that are adapted to cooperate with fastening hardware for allowing the splice closure to be racked in a manhole or hung on an aerial strand.

In particular applications, it may be desirable to mount such a splice closure to a pole, in which case, the use of a pole-mounting device that is adapted to secure the splice closure to the pole is required. Such a device, however, has been heretofore unavailable.

Therefore there is a need for improved devices which address these and other shortcomings of the prior art.

BRIEF SUMMARY OF THE INVENTION

Briefly stated, the present invention is directed to a bracket for mounting a splice closure, such as, for instance, a 3000 splice closure, manufactured by Lucent Technologies, Inc., to a pole. In a preferred embodiment, the bracket is configured with a longitudinal axis, and incorporates means for aligning the longitudinal axis in a parallel relationship with the longitudinal axis of the pole. Preferably, the means for aligning includes a base member with first and second base portions that are angled relative to each other along a centerline of the base member.

In accordance with another aspect of the present invention, a preferred embodiment includes first and second side walls extending outwardly from the base member, and means for engaging the splice closure. Preferably, the means for engaging the splice closure includes first and second arm segments extending outwardly from each of the first and second side walls, with each of the arm segments being adapted to engage one of the mounting ribs of the splice closure. In a preferred embodiment, the arm segments are adapted to receive the mounting ribs of the splice closure in a straddled configuration, with the arm segments being arranged between the mounting ribs.

In accordance with another aspect of the present invention, a preferred embodiment 0 incorporates a base member with first and second side walls extending outwardly therefrom. Preferably, each of the side walls include first and second arm segments that are spaced from each other to define a nesting area therebetween which is adapted to receive at least a portion of the splice closure.

Other objects, features, and advantages of the present invention will become apparent to one with skill in the art upon examination of the following drawings and detailed description. It is intended that all such objects, features, and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAIL DESCRIPTION OF THE PREFERRED EMBODIMENTS

Figure 1:
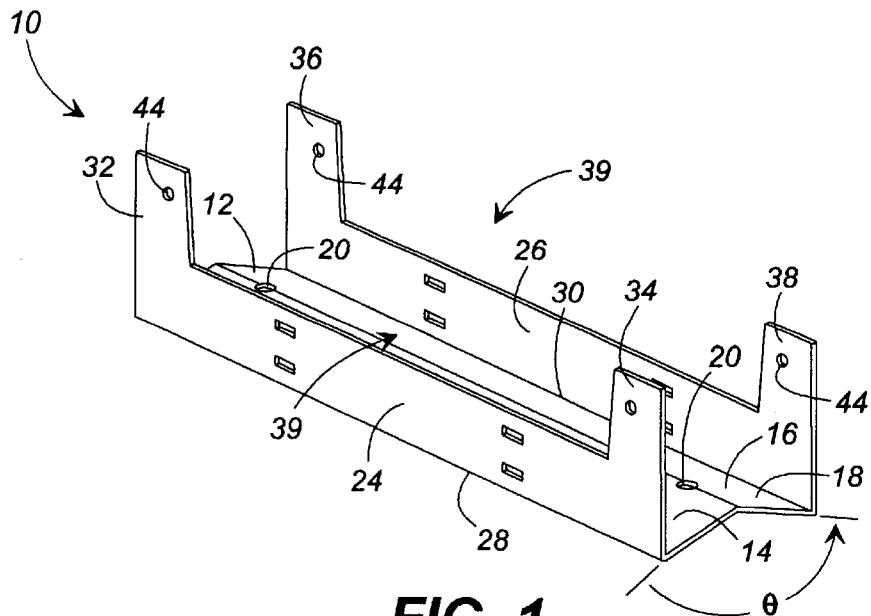
FIG. 1 is a perspective view of a preferred embodiment of the present invention.
Figure 2:
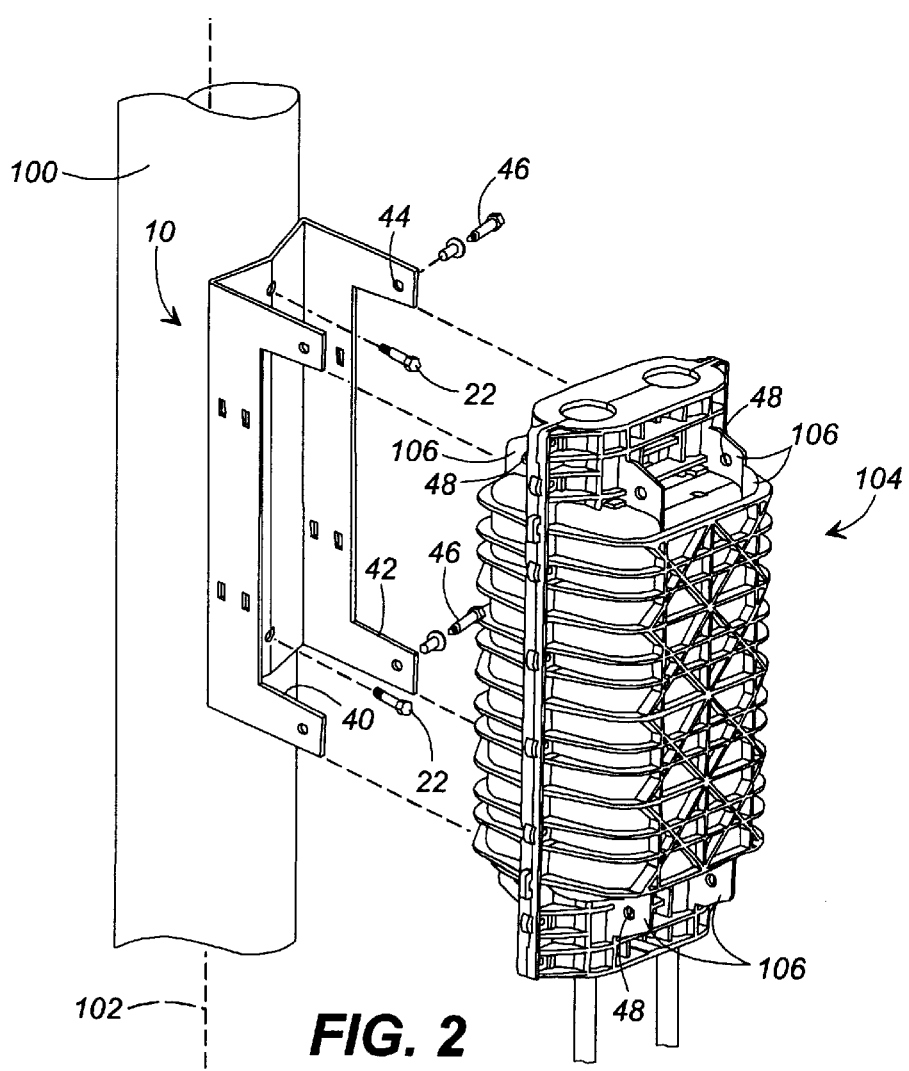
FIG. 2 is a partially exploded, perspective view of the embodiment depicted in FIG. 1, shown attached to a representative pole with mechanical fasteners, with a representative splice closure mounted thereto.

Reference will now be made in detail to the description of the invention as illustrated in the drawings wherein like numerals indicate like parts throughout the several views. As shown in FIGS. 1 and 2, a preferred embodiment of the mounting bracket 10 of the present invention incorporates a base 12 which is adapted to engage a pole 100, such as a utility pole. Preferably, proper alignment of the bracket with such a pole is facilitated by base portions 14 and 16 which are angled relative to each other at an angle θ of between approximately 90 degrees and approximately 175 degrees, preferably 162 degrees. So configured, rear surfaces of base portions 14 and 16 cooperate with each other, thereby providing a means for aligning a longitudinal axis of the bracket, i.e. centerline 18, with a longitudinal axis of the pole, so that the longitudinal axis of the bracket may be oriented substantially parallel to the longitudinal axis 102 of the pole. Means for affixing the bracket to the pole is provided by one or more pole-mounting holes 20 which are formed through the base and which are adapted for receiving mechanical fasteners, i.e. screws 22, which may be utilized when the pole is a wooden pole, for instance.

Side walls 24 and 26, respectively, extend outwardly from base portions 14 and 16, preferably from outer edges 28 and 30, respectively. In some embodiments, the side walls 24 and 26 extend from their respective base portions in a parallel relationship with each other, while, in other embodiments, the side walls may be inclined outwardly from each other, as described in detail hereinafter. Preferably, the side walls include means for engaging a splice closure. In particular, side wall 24 incorporates arm segments 32 and 34, and side wall 26 incorporates arm segments 36 and 38, with each of the arm segments being adapted to engage a corresponding portion of a splice closure, i.e., closure 104. As shown in FIGS. 1 and 2, the arm segments, such as segments 32 and 34 of side wall 24, are spaced from each other, thereby forming a nesting area 39 therebetween which is adapted for receiving a portion of the splice closure.

As shown in FIG. 2, engagement of the arm segments with closure 104 preferably is facilitated by aligning ribs 106 of the closure in a straddled configuration about the arm segments of the bracket so that the outer surface of each arm segment engages an inner surface of each rib. Once so aligned, the lower arm segments of the bracket tend to support the weight of the closure along their upper edges, 40 and 42 respectively, as the closure is nested within the nesting area 39, between the arm segments. Since, in some embodiments, the outer surfaces of opposing arm segments are spaced farther from each other than opposing inner surfaces of the ribs of the closure, a friction fit may be formed between the arm segments and the ribs of the closure. This friction fit tends to secure the closure in place during the mounting procedure.

Means for affixing the splice closure to the bracket preferably is provided, such as by a series of mounting holes 44 which are adapted for receiving mechanical fasteners, i.e., bolts 46, with one such mounting hole being formed through each of the arm segments. Each of the mounting holes are oriented to align with a corresponding mounting rib hole 48 formed through each of the ribs 106 of the closure. In some embodiments, internal threads may be formed integrally with the bracket, such as by an internally threaded nut being permanently mounted adjacent each mounting hole, with the internal threads being adapted for receiving the external threads of a bolt. So provided, one hand installation of a closure to the bracket may be facilitated as the technician need only utilize one hand for inserting a bolt through a mounting hole and securing the bolt therein, since his other hand does not need to be utilized for aligning a separate nut with the bolt.

Figure 3:
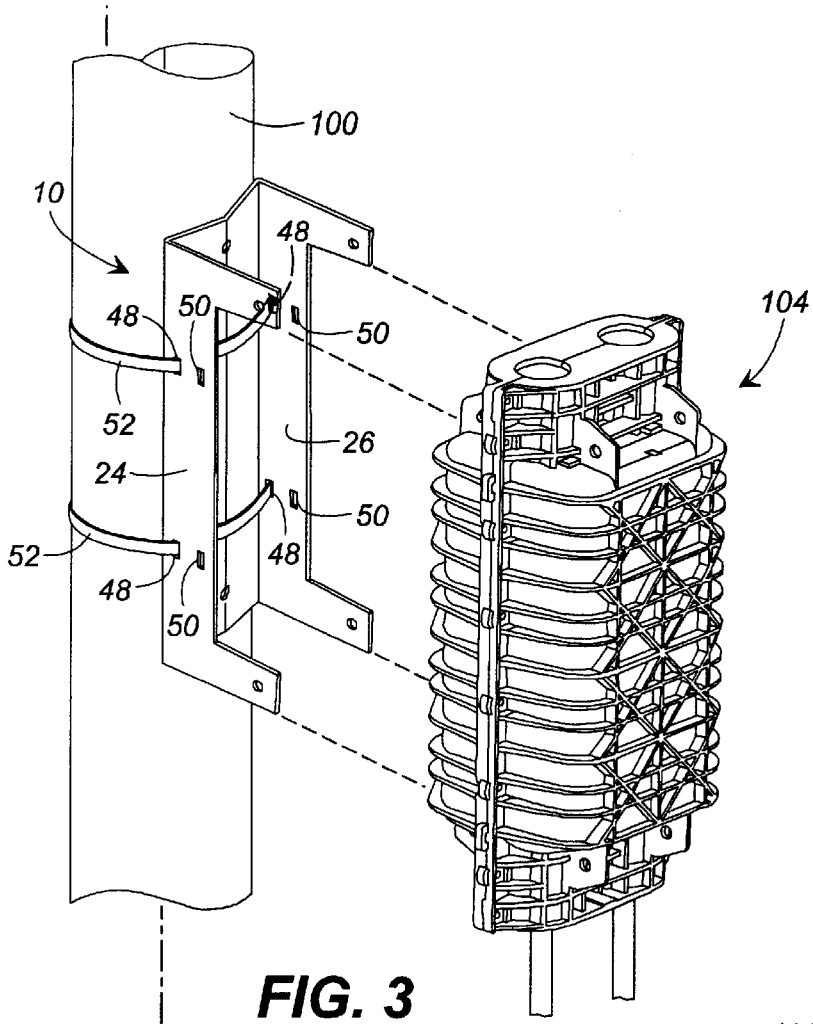
FIG. 3 is a partially exploded, perspective view of the embodiment depicted in FIG. 1, shown attached to a representative pole with mounting straps, with a representative splice closure mounted thereto.
Figure 4:
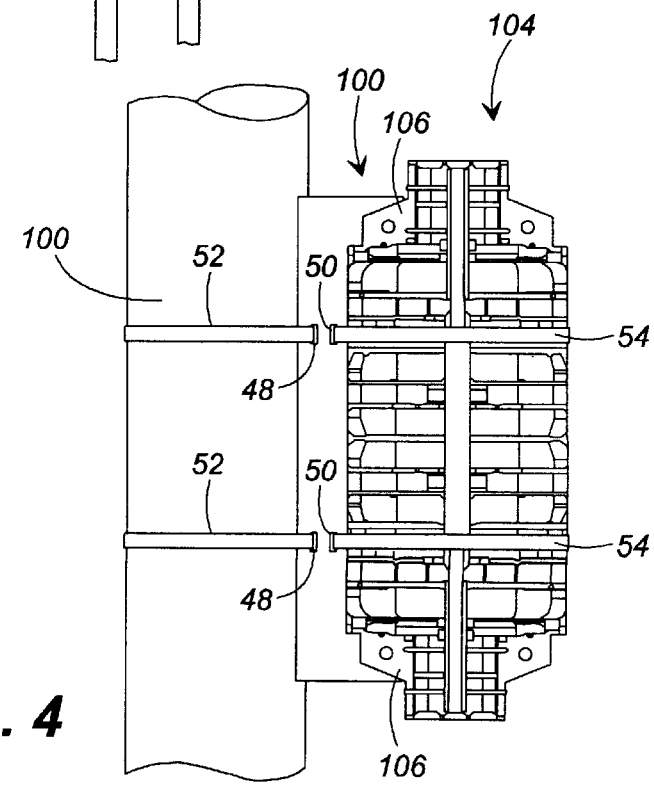
FIG. 4 is a side view of the embodiment depicted in FIG. 3.

As shown in FIG. 3, each side wall may incorporate a series of strap-receiving slots which are adapted to receive a strap for securing either the bracket to a pole, or a closure to he bracket. Preferably, each slot formed in side wall 24 cooperates with a corresponding slot formed in side wall 26 so that a strap may be placed through the corresponding slots. In the embodiment depicted in FIG. 3, for instance, two pairs of slots 48 are formed in the bracket side walls for fastening the bracket to a pole, and two pairs of slots 50 are formed in the bracket side walls for fastening a closure to the bracket. Preferably, each pair of slots 48 is adapted so that a strap 52 placed therethrough does not interfere with the nesting of the closure to the bracket, as described hereinbefore. As shown in FIG. 4, straps 54 extend through the slots 50 and are secured about an exterior of the closure for securing the closure to the bracket.

Straps formed of various materials, such as plated steel and stainless steel, for instance, may be utilized with the bracket and typically are securely fastened about the bracket by use of an integral or external fastener, such as a buckle.

Various other configurations for mounting a closure to a pole may be utilized and are considered well within the scope of the present invention. These configurations include mounting the bracket to a pole with mechanical fasteners while mounting a closure to the bracket with straps, as well as mounting the bracket to a pole with straps while mounting a closure to the bracket with mechanical fasteners.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A bracket for mounting a splice closure to a pole, the splice closure having first and second pairs of mounting ribs extending therefrom, each of the mounting ribs having a mounting rib hole formed therethrough, the pole having a longitudinal axis, said bracket comprising:

an elongated base member having a longitudinal axis, said base member having first and second base portions and first and second side walls, said first and second base portions engaging each other and being angled relative to each other along a centerline of said base member such that said longitudinal axis of said base member is configured to align with the longitudinal axis of the pole, said first side wall extending outwardly from said first base portion, said second side wall extending outwardly from said second base portion, each of said side walls having a first slot formed therethrough, each of said first slots being adapted to receive a strap therethrough such that said bracket is mountable to the pole by engaging the pole with said bracket, inserting the strap through said first slots, and then securely fastening the strap about the pole, each of said side walls having arm segments, each of said arm segments being configured to engage one of the mounting ribs of the splice closure, each of said arm segments having a mounting hole formed therethrough, each mounting hole being arranged to align with one of the mounting rib holes of the splice closure such that the splice closure is securable to said bracket by inserting a mechanical fastener through each of said mounting holes and the mounting rib hole corresponding thereto, said bracket being configured to secure the splice closure to the pole by being positioned between the splice closure and the pole.

2. The bracket of claim 1, wherein said first and second base portions are angled relative to each other at an angle of between approximately 90 degrees and approximately 175 degrees.

3. The bracket of claim 1, wherein said longitudinal axis of said bracket is oriented along a centerline of said bracket.

4. The bracket of claim 1, wherein said first arm segment of said first side wall and said first arm segment of said second side wall are arranged in a parallel relationship with each other.

5. The bracket of claim 1, wherein said first arm segment of said first side wall and said first arm segment of said second side wall are outwardly inclined from each other such that outer surfaces of said first arm segments engage inner surfaces of corresponding mounting ribs of the splice closure in a friction fit.

6. The bracket of claim 1, wherein outer surface of said arm segments are adapted to engage inner surfaces of the mounting ribs.

7. The bracket of claim 1, wherein said base member has at least one pole-mounting hole formed therethrough, said pole-mounting hole being adapted to receive a mechanical fastener for affixing said bracket to the pole.

8. A bracket for mounting a splice closure to a pole, the splice closure having first and second pairs of mounting ribs extending therefrom, each of the mounting ribs having a mounting rib hole formed therethrough, the pole having a longitudinal axis, said bracket comprising:

an elongated base member having a longitudinal axis, said base member having first and second base portions and first and second side walls, said first and second base portions engaging each other and being angled relative to each other along a centerline of said base member such that said longitudinal axis of said base member is configured to align with the longitudinal axis of the pole, said first side wall extending outwardly from said first base portion, said second side wall extending outwardly from said second base portion, each of said side walls having arm segments, each of said arm segments being configured to engage one of the mounting ribs of the splice closure, each of said arm segments having a mounting hole formed therethrough, each mounting hole being arranged to align with one of the mounting rib holes of the splice closure such that the splice closure is securable to said bracket by inserting a mechanical fastener through each of said mounting holes and the mounting rib hole corresponding thereto; and means for mounting said bracket to the pole, said means for mounting being configured to engage said bracket such that the splice closure is secured to the pole by said bracket being positioned between the splice closure and the pole.

9. The bracket of claim 8, wherein said first and second base portions are angled relative to each other at an angle of between approximately 90 degrees and approximately 175 degrees.

10. The bracket of claim 8, wherein said means for mounting comprises:

a first slot formed through each of said side walls; and a strap configured to insert through each of said slots, each of said slots being adapted to receive said strap therethrough such that said bracket is mountable to the pole by engaging the pole with said bracket, inserting said strap through said slots, and then securely fastening said strap about the pole.

11. The bracket of claim 8, wherein said means for mounting comprises:

a pole-mounting hole formed through said base member; and a mechanical fastener configured to insert through said pole-mounting hole, said pole-mounting hole being adapted to receive said mechanical fastener for securely fastening said bracket to the pole.

* * * * *